United States Patent [19]

Auclair

[11] Patent Number: 5,315,063
[45] Date of Patent: May 24, 1994

[54] GROUND CONNECTOR

[75] Inventor: William T. Auclair, Winsted, Conn.

[73] Assignee: Electric Motion Company, Inc., Winsted, Conn.

[21] Appl. No.: 943,297

[22] Filed: Sep. 10, 1992

[51] Int. Cl.⁵ .................. H01R 13/648; H01R 4/14
[52] U.S. Cl. .................................. 174/78; 174/108; 439/98
[58] Field of Search ............... 174/78, 106 R, 108, 174/109; 439/98, 99

[56] References Cited

U.S. PATENT DOCUMENTS

| | | | |
|---|---|---|---|
| 3,732,354 | 5/1973 | Thompson et al. | 174/78 X |
| 3,897,127 | 7/1975 | Haitmanek | 174/78 X |
| 4,032,205 | 6/1977 | Taj | 174/78 X |
| 4,080,024 | 3/1978 | Kroon | 174/78 X |
| 4,205,888 | 6/1990 | Wade | 174/78 X |
| 4,716,260 | 12/1987 | Hoffman et al. | 174/106 R |
| 5,028,742 | 6/1991 | Redman | 174/78 X |

Primary Examiner—Timothy V. Eley
Assistant Examiner—K. V. Nguyen
Attorney, Agent, or Firm—Chilton, Alix & Van Kirk

[57] ABSTRACT

A ground connector for grounding a small diameter cable enclosed by an exposed shield employs a collapsible tube formed by a strip of material wound in a spiral shape. A braided connector engages the shield and connects with a ground lead. An elastomeric covering biases the braided connector against the shield. The connector is forced against the shield when a pull-out force is applied to the strip.

18 Claims, 1 Drawing Sheet

GROUND CONNECTOR

BACKGROUND OF THE INVENTION

This invention relates generally to ground connectors employed for fiber optic cables, buried service wires and telephone cables. More particularly, the present invention relates to ground connectors which ground the shields of small diameter buried service wires, fiber optic cables and telephone cables.

A number of shield connectors have been developed for implementing bonding and grounding connections with the shields of buried service wires, fiber optic cables and telephone cables. The shield connectors employ means for establishing an electrical connection between the shield and a ground wire. The ground wire typically is affixed with a terminal connector which may connect to a binding post, ground point or other connection. The relatively small sheath and shield of some buried service wires, fiber optic cables and telephone cables increase the difficulty of mounting an effective ground connector. Because the small diameter service cables may also have a range of diameter sizes, conventional ground connector assemblies have often required a different size connector which is specifically dimensioned for a given service cable diameter.

The ease with which the connector may be installed in the field as well as the integrity of the ground connector over time are additional desirable features for an effective ground connector for small diameter cables.

SUMMARY OF THE INVENTION

Briefly stated, the invention in a preferred form is a ground connector assembly for grounding a small diameter cable having a shield. The assembly comprises an electrically conductive braid which defines a sleeve. A ground lead extends from the sleeve in electrically conductive communication therewith. An elastomeric covering surrounds the sleeve. A collapsible tube interiorly supports the electrically conductive braided sleeve at an enlarged diameter. The cable shield is inserted into the collapsible tube and the tube is collapsed by pulling on a tab. The elastomeric cover biases the conductive braided sleeve against the shield to establish an electrical connection. Any pulling force exerted on the ground lead results in the sleeve being further forced into engagement against the shield. A woven thermal-insulating layer may be interposed between the elastomeric covering and the sleeve. A terminal connector is affixed at the terminal end of the ground lead for connecting with a ground terminal or ground point.

An object of the invention is to provide a new and improved ground connector for grounding a small diameter fiber optic cable, a buried service wire or telephone cable.

Another object of the invention is to provide a new and improved ground connector which is adaptable for grounding different sized small diameter cables.

A further object of the invention is to provide a new and improved ground connector for grounding the shield of buried service wires and the shield of fiber optic cables wherein the ground connector exhibits superior pull-out strength upon installation.

A yet further object of the invention is to provide a new and improved ground connector for small diameter cables wherein the connector may be installed in an efficient manner to a cable shield.

Other objects and advantages of the invention will become apparent from the drawings and the specification.

DETAILED DESCRIPTION OF THE PREFERRED EMBODIMENT

Figure 2:
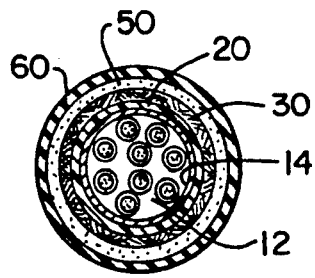
FIG. 2 is a cross-sectional view of the ground connector and service cable of FIG. 1 taken along the line 2—2 thereof.
Figure 4:
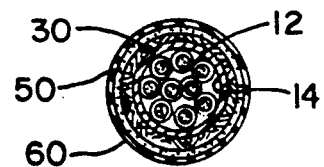
FIG. 4 is a cross-sectional view of the ground connector and service cable of FIG. 3 taken along the line 4—4 thereof.
Figure 1:
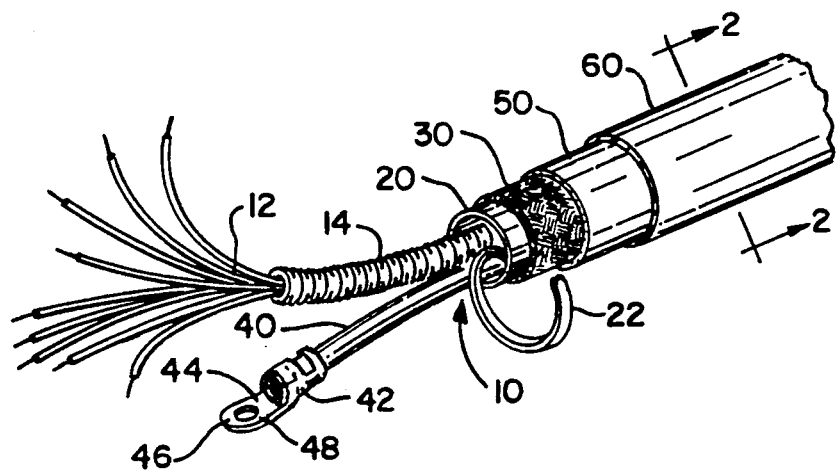
FIG. 1 is a perspective view of a portion of a service cable and a ground connector in accordance with the present invention, said ground connector being illustrated in a pre-installed configuration.
Figure 3:
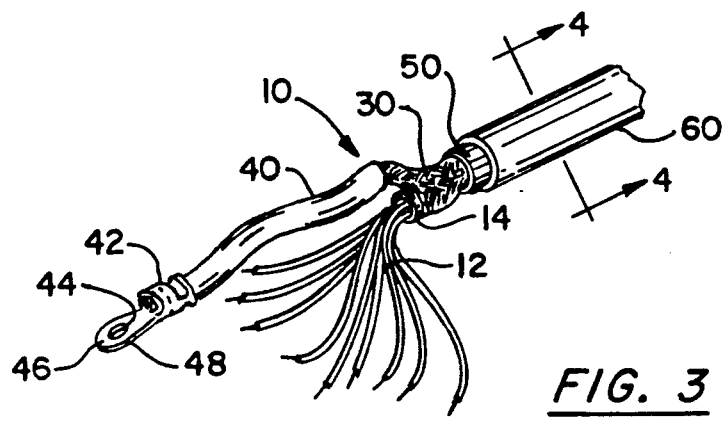
FIG. 3 is another perspective view of an installed configuration of the ground connector and service cable of FIG. 1.

With reference to the drawings wherein like numerals represent like parts throughout the figures, a ground connector in accordance with the present invention is generally designated with the numeral 10. Ground connector 10 is preferably employed for establishing a ground connection with small diameter buried service cables 12 or small diameter fiber optic cables (not illustrated). The ground connection is established between the cable shield 14 and a ground connection or a ground point (not illustrated). A given ground connector 10 may be suitably employed for establishing a ground connection with buried service wires or cables having a range of diametral dimensions as will be detailed below.

In the pre-installation configuration, the ground connector has a collapsable tube 20 made of plastic or other similar material. The tube 20 is constructed in a helical spiral which is secured by a small pull tab 22. The tab 22 typically connects the spiral along a breechable interface (not illustrated) on the order of a few thousandths of an inch. The tube 20 is collapsed or unravelled by pulling on the tab 22 thereby severing or tearing the interface.

An electrically conductive braided sleeve 30 is woven around the exterior surface of the tube and generally tightly engages the exterior tube surface. The sleeve 30 is supported by the tube at an enlarged diameter. The sleeve 30 is woven to allow the sleeve to be longitudinally stretched to assume a smaller diameter sleeve.

A ground lead 40 electrically connects with the braided sleeve 30. The ground lead 40 may be a solid or a flexible lead. The ground lead 40 typically extends a few inches from the sleeve 30 and projects generally axially beyond the end of the tube. A connector 42 is affixed at the end of the ground lead 40. The connector may be crimped and/or soldered to the lead. In one form, the connector has an aperture 44 for mounting to a ground post. The connector may include a distal end portion having a segment 46 which may be suitably twisted and removed to provide a clip-type ground connection. Alternately, a different segment 48 may be removed to form a hook-type connection.

A thermal insulating layer 50 of woven material preferably surrounds the sleeve 30 in close fitting relationship therewith. An elastomeric tubular cover 60 resiliently engages the exterior surface of the insulting layer and exerts a biasing force against the sleeve 30. In some embodiments, layer 50 is not required.

The ground connector 10 is installed by initially exposing the proper length of the service cable 12. Typically 4 inches of the outer sheath of the service cable is removed and any flooding compound is also removed to expose the shield 14. The service cable is inserted into the collapsible tube 20 from the end opposite the projecting lead 40. Preferably, the shield 14 extends one-half to one inch beyond the opening of the tube. The service cable 12 and the ground connector 10 are grasped while the tab 22 on the collapsible tube is pulled. The pulling unravels the tube 20 which is withdrawn from the assembly. The elastomeric cover 60 biases the braided sleeve 30 into direct intimate engagement with the shield 14. Any attempt to pull the connector lead 40 essentially self-loads the braided sleeve 30 and forces the sleeve 30 into a more intimate electric contact with the shield.

The terminal connector 42 of the ground wire will then be connected to a binding post, ground point or other connection (not illustrated) as desired.

The elastomeric cover 60 which preferably has the form of a rubber sheath provides a uniform tension on the braided connector so as to provide for excellent pull-out strength. The one step-no tool installation makes the ground connector relatively easy to install in the field. In addition, the connector can be installed on a range of cable diametral dimensions. The braided sleeve 30 functions like a Chinese finger puzzle so that the braided is essentially tightened against the shield when a pulling force is exerted on the ground lead 40. The uniform pressure exerted by the cover 60 also functions as a strain relief to keep the shield 14 from bending or breaking.

In alternate embodiments, flat or round wires may be interposed in the elastomeric cover 60. The elastomeric cover 60 may be layered so that a latex material is on the inner layer and a silicon, gum or EPDM is on the outside layer. The ground lead 40 may be either solid or flexible.

While a preferred embodiment of the foregoing invention is set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A ground connector assembly for grounding a cable having an exposed shield comprising:
   tube means for providing a collapsible tube having an axial opening and an exterior surface, said tube means comprising a strip of material wound in a spiral having side edges connected along a tearable interface, said collapsible tube is deformed by exerting an axial pull-out force on said strip;
   sleeve means comprising an electrically conductive braided sleeve surrounding said tube means;
   ground lead means electrically connected to said sleeve means; and
   elastomeric cover means surrounding said sleeve means, so that when said cable is inserted in said axial opening and said tube is collapsed, said cover means biases said sleeve into electrical contact against said shield.

2. The ground connector of claim 1 wherein said lead means further comprises a lead wire having a terminus and a connector defining an aperture mounted at said terminus.

3. The ground connector of claim 2 wherein said connector further comprises a segment which is removable to form a clip.

4. The ground connector of claim 1 further comprising a thermal insulating layer interposed between said sleeve means and said cover means.

5. The ground connector of claim 4 wherein said layer is comprised of woven material.

6. The ground connector of claim 1 wherein said elastomeric covering means is comprised of rubber.

7. The ground connector of claim 1 wherein said elastomeric covering means comprises an inner layer of latex and an outer layer selected from the group consisting of silicon, gum or rubber.

8. The ground connector of claim 1 wherein the lead means comprises a solid lead wire.

9. The ground connector of claim 2 wherein said connector further comprises a segment which is removable to form a hook.

10. A ground connector assembly for grounding a cable having an exposed shield comprising:
    tube means for providing a collapsible tube having an axial opening and an exterior surface, said tube means comprising a strip of material wound in a spiral having side edges connected along a tearable interface, said collapsible tube is deformed by exerting an axial pull-out force on said strip;
    sleeve means comprising an electrically conductive braided sleeve having a variable diameter and supported on said tube means at an enlarged diameter portion;
    ground lead means electrically connected to said sleeve means;
    elastomeric cover means surrounding said sleeve means, so that when said cable is inserted in said axial opening and said tube is collapsed, said cover means biases said sleeve to a reduced diameter into electrical contact against said shield.

11. The ground connector of claim 10 wherein said lead means further comprises a lead wire having a terminus and a connector defining an aperture mounted at said terminus.

12. The ground connector of claim 11 wherein said connector further comprises a segment which is removable to form a clip.

13. The ground connector of claim 11 wherein said connector further comprises a segment which is removable to form a hook.

14. The ground connector of claim 9 further comprising a thermal insulating layer interposed between said sleeve means and said cover means.

15. The ground connector of claim 14 wherein said layer is comprised of woven material.

16. The ground connector of claim 10 wherein said elastomeric covering means is comprised of rubber.

17. The ground connector of claim 10 wherein said elastomeric covering means comprises an inner layer of latex and an outer layer selected from the group consisting of silicon, gum or rubber.

18. The ground connector of claim 10 wherein the lead means comprises a solid lead wire.

* * * * *